(12) United States Patent
Vennam et al.

(10) Patent No.: US 10,642,441 B2
(45) Date of Patent: May 5, 2020

(54) OPTIMAL WINDOW PLACEMENT SYSTEM

(71) Applicant: International Business Machines Corporation, Armonk, NY (US)

(72) Inventors: Belinda M. Vennam, Austin, TX (US); Ramratan Vennam, Austin, TX (US); Spencer T. Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 15/965,487

(22) Filed: Apr. 27, 2018

(65) Prior Publication Data

US 2019/0332226 A1 Oct. 31, 2019

(51) Int. Cl.
| | | |
|---|---|---|
| *G06F 3/0481* | (2013.01) | |
| *G06F 3/14* | (2006.01) | |
| *G06F 3/0484* | (2013.01) | |
| *G06F 9/451* | (2018.01) | |

(52) U.S. Cl.
CPC ........ *G06F 3/0481* (2013.01); *G06F 3/04847* (2013.01); *G06F 3/1423* (2013.01); *G06F 9/452* (2018.02)

(58) Field of Classification Search
CPC .. G06F 3/0481; G06F 3/04847; G06F 3/1423; G06F 9/452; G06F 3/0485
See application file for complete search history.

(56) References Cited

U.S. PATENT DOCUMENTS

| | | |
|---|---|---|
| 5,621,904 A | 4/1997 | Elliott et al. |
| 7,161,557 B2 | 1/2007 | Thornton |
| 7,590,947 B1 | 9/2009 | Gay et al. |
| 8,314,809 B1 * | 11/2012 | Grabowski ............. G06T 15/20 345/548 |
| 9,703,444 B2 | 7/2017 | Nicholson et al. |
| 2005/0223334 A1 | 10/2005 | Guido et al. |
| 2009/0094549 A1 | 4/2009 | Adams |
| 2010/0011316 A1 | 1/2010 | Sar et al. |
| 2012/0159393 A1 * | 6/2012 | Sethi ..................... G06F 3/0485 715/830 |
| 2013/0091459 A1 * | 4/2013 | Park ..................... G06F 3/0418 715/784 |
| 2016/0110062 A1 * | 4/2016 | VanBlon ............... G06F 3/0488 715/733 |
| 2016/0320938 A9 | 11/2016 | Massand | |

FOREIGN PATENT DOCUMENTS

CA 2711450 A1 7/2009

* cited by examiner

*Primary Examiner* — Mark Edwards
(74) *Attorney, Agent, or Firm* — Yee & Associates, P.C.

(57) ABSTRACT

A method, apparatus, system, and computer program product for managing windows in a computer system. The computer system tracks a directional movement of information displayed for a set of applications within a group of display devices to form historical movement information, wherein the directional movement is in response to a user input from a user. Characteristics are identified by the computer system for a current group of display devices. The computer system displays a group of the windows for the set of applications within the current group of display devices based on the historical movement information and the characteristics detected.

21 Claims, 7 Drawing Sheets

OPTIMAL WINDOW PLACEMENT SYSTEM

BACKGROUND

1. Field

The disclosure relates generally to an improved computer system and, more specifically, to a method, an apparatus, and a computer program product for managing windows in a computer system.

2. Description of the Related Art

Developers, designers, programmers, and other technology personnel often use multiple display devices in day-to-day work activities. Some of these display devices may have a different orientation spec to other monitors. For example, a display device with a horizontal display has an orientation in which the longer side of the display device is horizontal. A display device with a vertical display has an orientation in which the longer side of the display device is vertical.

Some applications may be more useful on a horizontal display while other applications may be more useful on a vertical display. For example, the horizontal display may be an optimal orientation for viewing information such as email messages or spreadsheets. The vertical display may be an optimal orientation for reviewing program code, documents, or webpages.

Currently, with multiple display devices, when a user starts an application, the user has to look at the window for an application to see whether the window is in the display device that is best for that application. The user may then manually move the window to the correct display device. Further, the user may also resize the window to be full-screen or partial screen. Thus, when the window is not displayed in a desired manner for the user, the user is compelled to take time to move or otherwise adjust the window. In some cases, the user may compensate by inefficiently reviewing the information displayed in the window rather than adjusting the window for a more optimal display of the information.

Therefore, it would be desirable to have a method and an apparatus that take into account at least some of the issues discussed above, as well as other possible issues. For example, it would be desirable to have a method and an apparatus that overcome a technical problem with optimally displaying windows on multiple display devices in a manner that increases ease at which information displayed on the windows can be reviewed a user.

SUMMARY

According to one embodiment of the present invention, a method for managing windows in a computer system is provided. The computer system tracks a directional movement of information displayed for a set of applications within a group of display devices to form historical movement information, wherein the directional movement is in response to a user input from a user. Characteristics are identified by the computer system for a current group of display devices. The computer system displays a group of the windows for the set of applications within the current group of display devices based on the historical movement information and the characteristics detected.

According to another embodiment of the present invention, a window display system is provided. The window display system comprises a computer system that tracks a directional movement of information displayed for a set of applications within a group of display devices to form historical movement information, wherein the directional movement is in response to a user input from a user; identifies characteristics for a current group of display devices; and displays a group of windows for the set of applications within the current group of display devices based on the historical movement information and the characteristics detected.

According to yet another embodiment of the present invention, a computer program product for managing windows displayed in a computer system is provided. The computer program product comprises a computer readable storage media; and first program code, second program code, and third program code, which are all stored on the computer readable storage media. The first program code tracks a directional movement of information displayed for a set of applications within a group of display devices to form historical movement information, wherein the directional movement is in response to a user input from a user. The second program code identifies characteristics for a current group of display devices. The third program code displays a group of windows for the set of applications within the current group of display devices based on the historical movement information and the characteristics detected.

DETAILED DESCRIPTION

Figure 1:
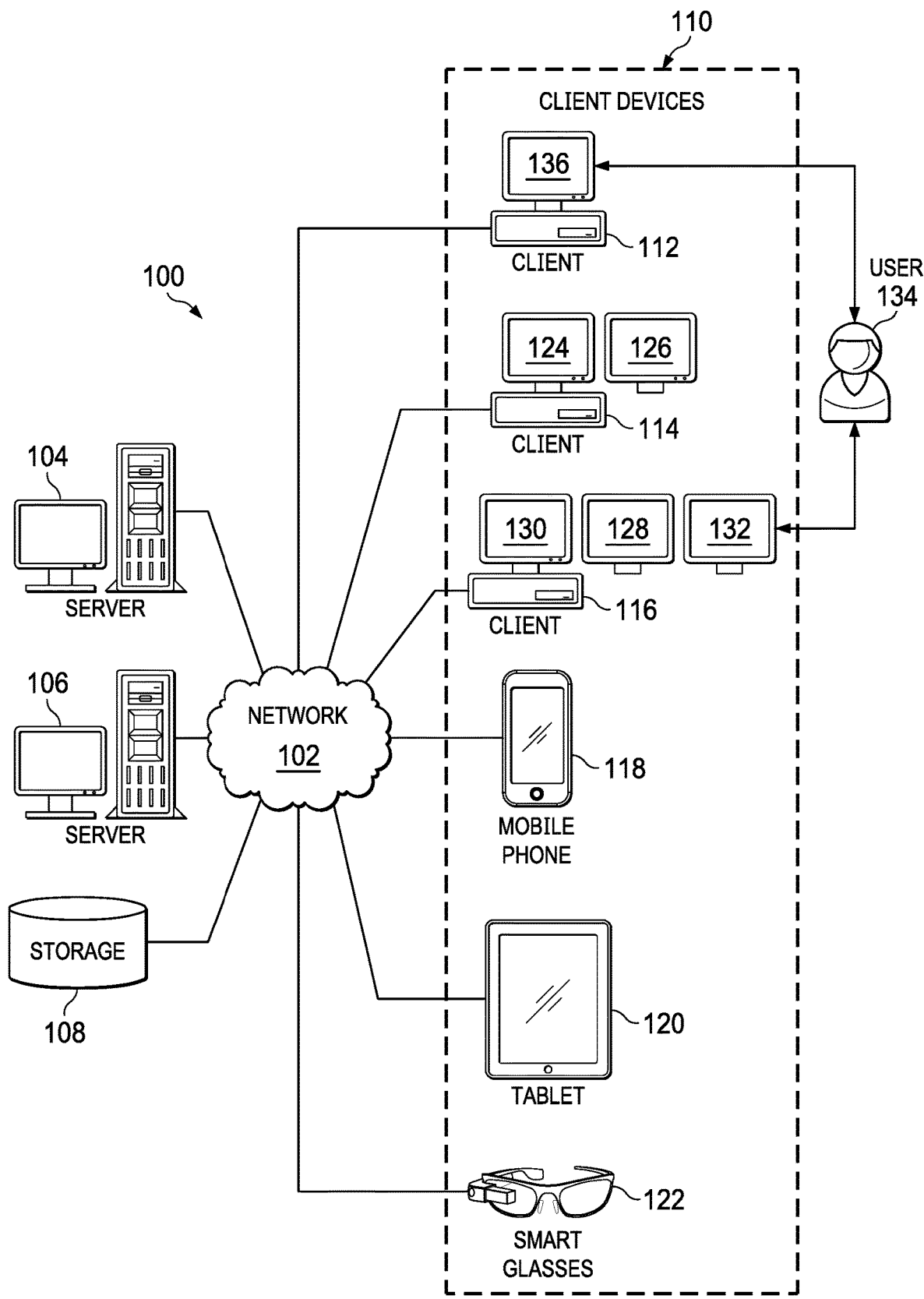
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that one manner in which windows can be controlled is to remember the last location and dimensions for the window. The illustrative embodiments recognize and take into account that this solution does not take into account a change in the configuration of the display devices. For example, a display device may be added, removed, replaced, or reoriented. With this situation, the illustrative embodiments recognize and take into account that the user may be compelled to move the window to another display device.

The illustrative embodiments also recognize and take into account that the optimal display of a window may include more than a horizontal orientation or a vertical orientation of the display device. The illustrative embodiments recognize and take into account that other factors may also affect the optimal display of the monitor in addition to or in place of a horizontal or vertical orientation of the display device. For example, the illustrative embodiments recognize and take into account that the resolutions of the display devices may affect the selection of which display device is best for displaying a window for a particular application. For example, the illustrative embodiments recognize and take into account that an application in which code is displayed may involve adding the window in a vertical configuration such that the height of the window is greater than the width of the window.

The illustrative embodiments recognize and take into account that a 4K display device has a resolution of 3840× 2160, while a 720p display device has a resolution of 1280×720 when both display devices are in a horizontal orientation. The illustrative embodiments recognize and take into account that when the 720p display device is in a vertical orientation and the 4K display device is in a horizontal orientation, an application with a window that has an optimal display of information using a vertical configuration is displayed in a more usable fashion for the vertical configuration on the 4 k display device in the horizontal orientation as compared to the 720p display device in the vertical orientation.

Thus, the illustrative embodiments provide a method, an apparatus, a system, and a computer program product for managing a display of windows in a computer system. In one illustrative example, a computer system tracks a directional movement of information displayed for a set of applications within a group of display devices to form historical movement information, wherein the directional movement is in response to user input from a user. The computer system identifies characteristics for a current group of display devices, and displays a group of windows for the set of applications within the current group of display devices based on the historical movement information and the characteristics detected.

As used herein, "a set of," when used with reference items, means one or more items. For example, "a set of applications" is one or more applications. Additionally, "a group of," when used with reference to items, means one or more items. For example, "a group of display devices" is one or more display devices.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, when used with reference to items, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C, or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, some of client devices 110 may include multiple display devices. For example, client computer 114 includes display device 124 and display device 126. As another example, client computer 116 includes display device 128, display device 130, and display device 132. In this example, client computer 112 has display device 136.

In the illustrative example, a window manager can be implemented in one or more of client devices 110, server computer 104, server computer 106, or some combination thereof. The window manager can monitor and analyze the behavior of a user using an application. The window manager can identify the type of interaction with information displayed in the window for a particular application.

For example, this type of interaction may include monitoring directional movement of the information such as a direction of scrolling of the information. This scrolling behavior is utilized to identify an affinity for the manner in which the information is displayed for that particular application. The scrolling behavior may indicate an affinity for scrolling information displayed in a window for the application in a horizontal direction or a vertical direction.

With this information, the window manager can display windows on a client device such as client computer 116 operated by user 134. The monitoring of user input for interaction of user 134 with information displayed for applications on client computer 116 can be monitored and analyzed to identify an optimal manner for displaying windows on one or more of display device 128, display device 130, and display device 132 for client computer 116. In other words, the window management system can identify which one of display device 128, display device 130, and display device 132 is the optimal display device for displaying a window for a particular application. Further, the window management system can also determine the optimum size for the window. As another example, when user 134 operates client computer 114 or client computer 112, the analysis of user interaction with information for applications on client computer 116 can be applied to identify the optimal display for windows for those applications used on client computer 114 and client computer 112.

In the illustrative example, a display device is a physical device that can take various forms. For example, a display device can be selected from a group comprising a light-emitting diode (LED) display, a liquid crystal display (LCD), an organic light emitting diode (OLED) display, a computer monitor, a projector, a flat panel display, or some other suitable device that can output information for the presentation of information.

Figure 2:
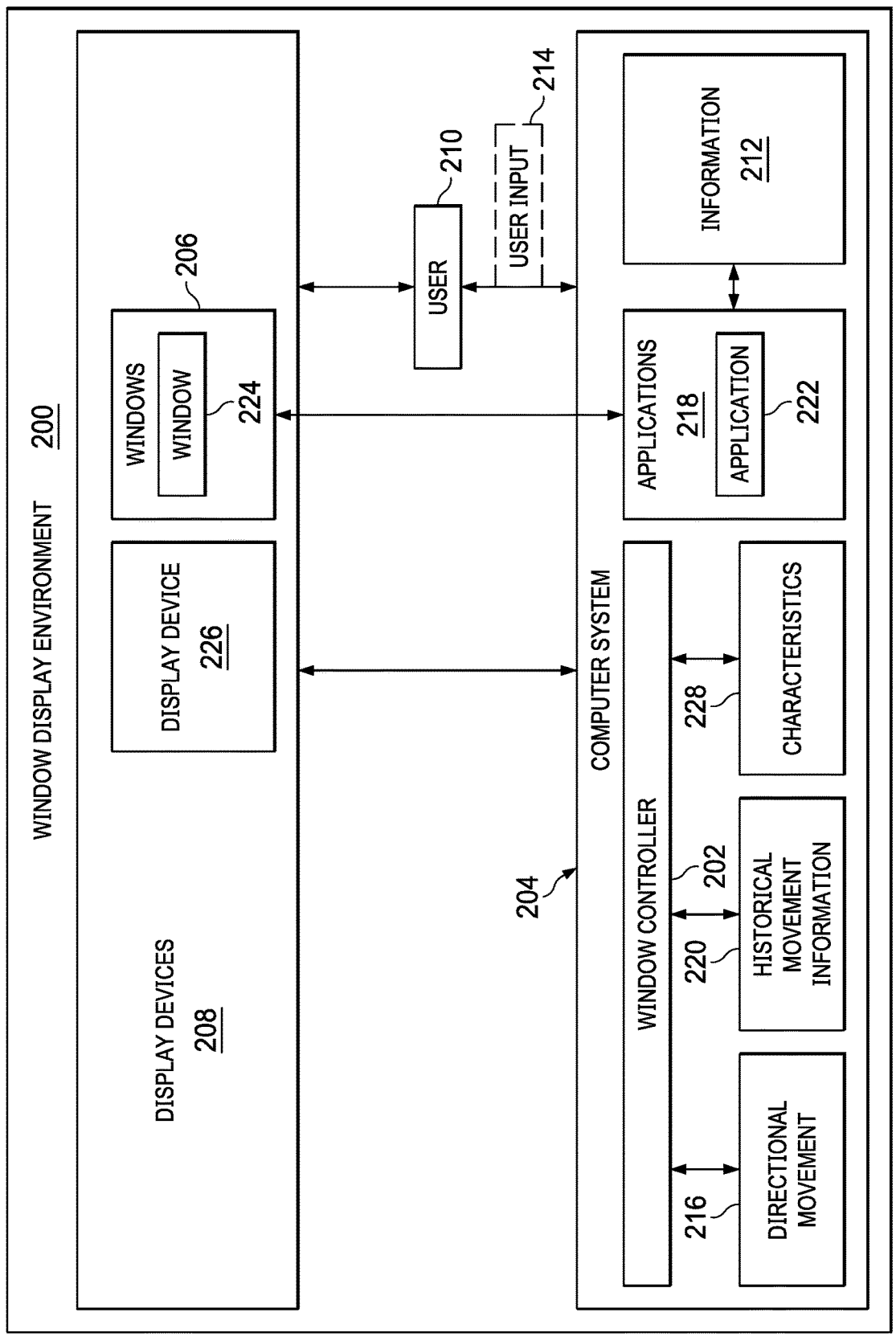
FIG. 2 is a block diagram of a window display environment in accordance with an illustrative embodiment.

With reference now to FIG. 2, a block diagram of a window display environment is depicted in accordance with an illustrative embodiment. In this illustrative example, window display environment 200 includes components that can be implemented in hardware such as the hardware shown in network data processing system 100 in FIG. 1.

Window controller 202 running on computer system 204 in window display environment 200 operates to control how windows 206 are displayed on display devices 208. In this illustrative example, window controller 202 is configured to cause windows 206 to be displayed on display devices 208 in an optimal manner. For example, the optimal manner may be which display device in display devices 208 displays a particular window in windows 206. As depicted, window controller 202 can be a display driver in communication with an operating system for data processing system in computer system 204.

Window controller 202 may be implemented in software, hardware, firmware, or a combination thereof. When software is used, the operations performed by window controller 202 may be implemented in program code configured to run on hardware, such as a processor unit. When firmware is used, the operations performed by window controller 202 may be implemented in program code and data and stored in persistent memory to run on a processor unit. When hardware is employed, the hardware may include circuits that operate to perform the operations in window controller 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, window controller 202 can be implemented as software that is in communication with an operating system part of the operating system within computer system 204. For example, window controller 202 may be a device driver for display devices 208. In another example, window controller 202 may be implemented in an operating system kernel.

Computer system 204 is a physical hardware system and includes one or more data processing systems. When more than one data processing system is present, those data processing systems are in communication with each other using a communications medium. The communications medium may be a network. The data processing systems may be selected from at least one of a computer, a server computer, a laptop computer, a workstation, a tablet, or some other suitable data processing system.

The display of windows 206 is based on how user 210 interacts with information 212 displayed in one or more of windows 206. The interaction by user 210 with information 212 displayed in windows 206 on one set of display devices 208 can be used to determine the optimal display of windows 206 on another set of display devices 208.

In one illustrative example, window controller 202 in computer system 204 operates to track directional movement 216 of information 212 displayed for a set of applications 218 within a group of display devices 208 to form historical movement information 220. In one illustrative example, information 212 may be displayed for application 222 in applications 218 in window 224 on display device 226 in the set of display devices 208.

In this depicted example, directional movement 216 is in response to user input 214 from user 210. Window controller 202 is at least one of a software process that communicates with an operating system or is part of the operating system in computer system 204 such that window controller 202 is able to identify directional movement 216. For example, window controller 202 may receive or detect user input 214 that causes directional movement 216 of information 212 within the current group of windows 206.

Window controller 202 identifies characteristics 228 for a current group of display devices 208. In this illustrative example, window controller 202 is at least one of a software process that communicates with an operating system or is part of the operating system such that window controller 202 is able to obtain characteristics 228 for the current group of display devices 208. These characteristics may include, for example, at least one of resolution or frequency. In identifying characteristics 228 for the current group of display devices 208, window controller 202 identifies characteristics 228 for the current group of display devices 208 in response to at least one of starting application 222 in the set of applications 218 by user 210 or a change in a configuration of the current group of display devices 208. For example, a displace device may be removed, added, replaced, reoriented, or changed in resolution.

In this illustrative example, window controller 202 displays a group of windows 206 for the set of applications 218 within the current group of display devices 208 based on historical movement information 220 and characteristics 228 detected for the current group of display devices 208. In displaying a group of windows 206, window controller 202 selects display device 226 within the current group of display devices 208 for displaying window 224 for application 222 in the set of applications 218 based on historical movement information 220 and characteristics 228 detected. Window controller 202 then displays window 224 on display device 226 within the current group of display devices 208. In this illustrative example, window 224 has a width and a height that is selected based on historical movement information 220 and characteristics 228 detected.

Figure 3:
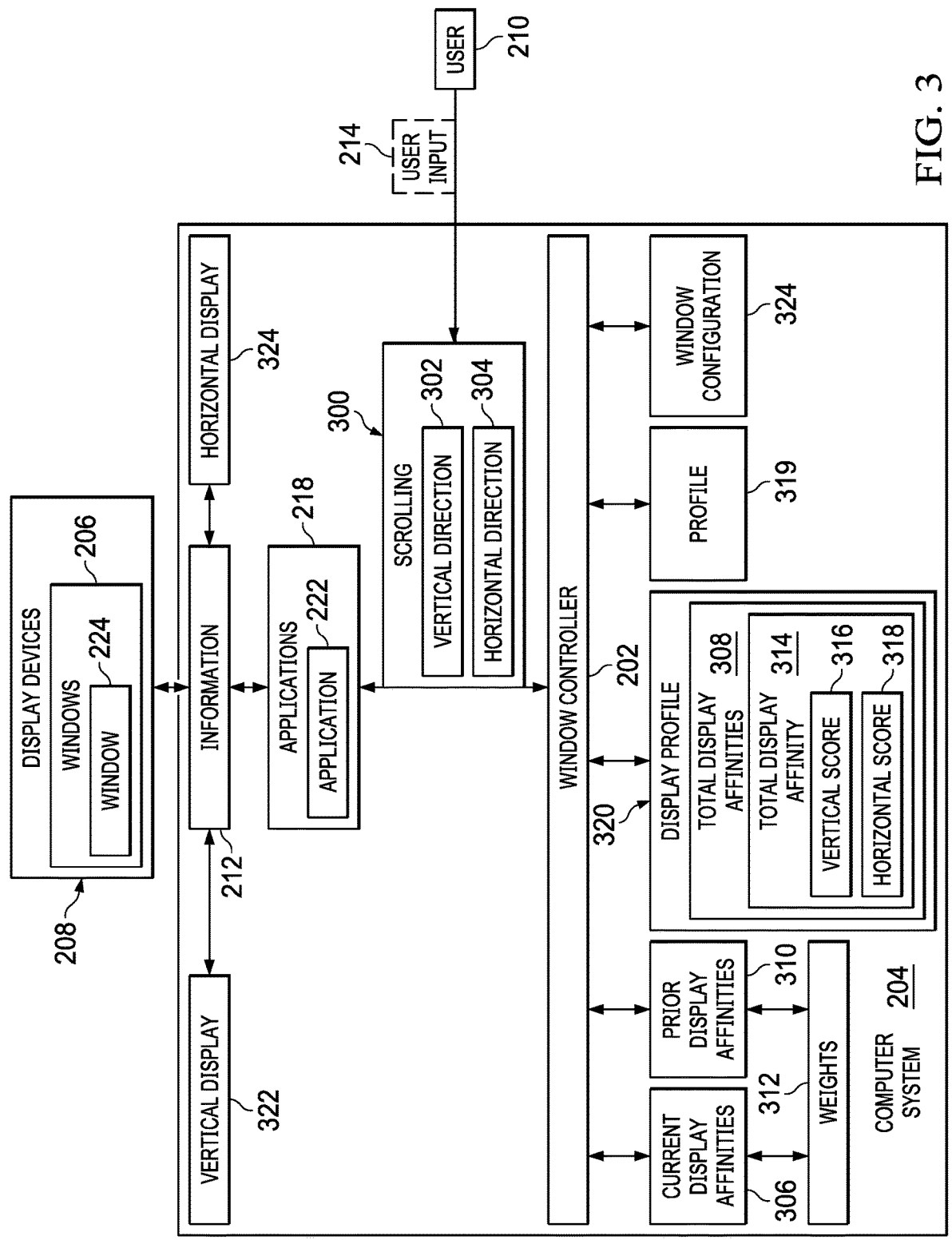
FIG. 3 is an illustration of a data flow for generating historical movement information in accordance with an illustrative embodiment.

With reference to FIG. 3, an illustration of a data flow for generating historical movement information is depicted in accordance with an illustrative embodiment. In the illustrative examples, the same reference numeral may be used in more than one figure. This reuse of a reference numeral in different figures represents the same element in the different figures.

In this illustrative example, window controller 202 tracks directional movement 216 in FIG. 2 to form historical movement information 220 in FIG. 2. For example, in tracking directional movement 216, window controller 202 detects scrolling 300 of information 212 in vertical direction 302 and horizontal direction 304 in a set of windows 206 for the set of applications 218 within the group of display devices 208 to form historical movement information 220. In this example, scrolling 300 of information 212 in vertical direction 302 and horizontal direction 304 occurs in response to user input 214 by user 210.

As depicted, window controller 202 assigns a set of current display affinities 306 to the set of applications 218 based on scrolling 300 of information 212. Window controller 202 determines a set of total display affinities 308 for the set of applications 218 using the set of current display affinities 306 and a group of prior display affinities 310 for the set of applications 218. The set of current display affinities 306 and the group of prior display affinities 310 are weighed based on a length of time. In other words, weights 312 are assigned to the set of current display affinities 306 and the group of prior display affinities 310.

In this illustrative example, each application in the set of applications 218 is assigned a current display affinity in the set of current display affinities 306. Further, an application in the set of applications 218 that was previously tracked for directional movement 216 in FIG. 2 will have one or more of prior display affinities 310. An application that is tracked for the first time will only have a current display affinity in this illustrative example.

In this illustrative example, total display affinity 314 in the set of total display affinities 308 for application 222 in the set of applications 218 comprises vertical score 316 and horizontal score 318. For example, total display affinity 314 can be determined as follows:

$$TDA = (cv, ch)cw + \Sigma_{i=1}^{n}(pv_i, ph_i)pw_i$$

where TDA is the total display affinity, cv is a current vertical score, ch is a current horizontal score, cw is a current weight, pv is a prior vertical score, ph is a prior horizontal score, pw is a prior weight, i is an integer, and n is the number of prior affinities.

Each of prior display affinities 310 is from a prior session in which the application was used. Each particular session produces a measure of the vertical score and horizontal score for a display affinity. A horizontal score is based on how much horizontal scrolling occurs. A vertical score is based on how much vertical scrolling occurs. For example, the number of lines of scrolling in these directions may be used to generate the scores. In other words, in detecting scrolling 300, window controller 202 determines how much time user 210 spends scrolling in a vertical direction versus a horizontal direction. In this manner, the affinity is based on user input 214 in addition to characteristics 228 in FIG. 2 for display devices 208. The scores may take various forms. For example, vertical score 316 and horizontal score 318 may each have a value that is a percentage of the time spent for scrolling in a particular direction. More recent display affinities have a higher value for the weight. In other words, a higher weight is given to more recent sessions for a particular application. In this manner, window controller 202 can take into account shifts or changes in which user 210 interacts with an application and a window. Further, the manner in which user 210 interacts with an application over time can be taken into account. For example, user 210 may use a different spreadsheet after some period of time. The original spreadsheet may have resulted in a higher vertical score while the new spreadsheet may result in a higher horizontal score.

Consequently, total display affinity 314 for application 222 is utilized by window controller 202 to determine how to display window 224 in an optimal manner for a particular user, such as user 210. In this illustrative example, total display affinity 314 can form display profile 320 for user 210. This display can be performed in a manner that optimizes the viewing of information 212 in window 224 for user 210. This optimization is tailored to user 210 based on the manner in which user 210 interacts with information 212. This display of window 224 can be performed for different configurations of the set of display devices 208. The different configurations can comprise at least one of different numbers of display devices 208, different orientations for display devices 208, different resolutions between display devices 208, and other factors that may be used to create different configurations.

For example, if a vertical display device and a horizontal display device are present in the set of display devices 208, a higher vertical score in the total display affinity indicates that it is more optimal to display a window in the vertical display device rather than the horizontal display device. In another example, if both display devices have the same orientation, such as horizontal display devices, then the display device having a higher resolution horizontally may be selected. In other words, the display device having more vertical lines for displaying information is selected for displaying the window.

Thus, when vertical score 316 is greater than horizontal score 318 in total display affinity 314, vertical display 322 is desired for an optimal display of information 212. Vertical display 322 may be selected based on at least one of the orientation or resolution of a display device that provides the greatest number of lines for a vertical display of information 212. When horizontal score 318 is greater than vertical score 316 in total display affinity 314, horizontal display 324 is desired for an optimal display of information 212. Horizontal display 324 is selected based on at least one of on at least one of the orientation or resolution of a display device that provides the greatest number of lines for a horizontal display of information 212.

Additionally, window controller 202 also may identify window configuration 325 for window 224 based on the manner in which user 210 interacts with window 224. For example, window controller 202 may determine whether to use a full-screen or partial screen for displaying window 224 based on past interactions with window 224 for application 222 through user input 214 from user 210 resizing window 224. For example, the dimensions of window 224 can be selected based on vertical score 316 and horizontal score 318 in total display affinity 314. When vertical score 316 is higher than a threshold, user 210 may have been scrolling more in the vertical direction. As a result, more vertical space may be needed than the last time user 210 interacted with window 224. A lower vertical score and a lower horizontal score can mean that user 210 did not need to scroll very much and the dimensions of window 224 from the last use of application 222 does not need to change. The scores can be obtained from a history of vertical scores and horizontal scores. The scores needed to select the dimensions for window 224 can be based on a set of rules that employ one or more thresholds to set dimensions for window 224 based on vertical score 316 and horizontal score 318 in total display affinity 314.

Further, in tracking directional movement 216 in FIG. 2, window controller 202 tracks directional movement 216 of information 212 displayed for the set of applications 218 within a plurality of different configurations for the group of display devices 208 to form historical movement information 220 in FIG. 2. In other words, the group of display devices 208 can contain at least one of different numbers of display devices 208 or different types of display devices 208 at different times when tracking of directional movement 216 occurs. For example, user 210 may use a laptop computer having a single display device in the group of display devices 208. User 210 may then travel to an office and connect the laptop to two display devices for a total of three display devices in the group of display devices 208.

Total display affinity 314 in display profile 320 can be used by window controller 202 to manage the display of windows 206 in various configurations of display devices 208 on different data processing systems within computer system 204. In other words, user 210 may use more than one data processing system within computer system 204. When using different data processing systems, window controller 202 can access total display affinities 308 and profile 319 to provide a customized display of windows 206 within particular display devices connected to the particular data processing system utilized by user 210.

Further, window controller 202 can also control the display of a group of windows 206 for different instances of an application. In these illustrative examples, an instance of an application is considered another application in the set of applications 218. For example, a spreadsheet application may be used to view two different spreadsheets. A first spreadsheet may be viewed optimally in a horizontal display based on the total display affinity for the first spreadsheet. A second spreadsheet may be viewed optimally in a vertical display based on the total display affinity for the second spreadsheet. Although these two spreadsheets are using different instances of the same application, each instance is considered a different application in applications 218 with respect to determining an optimal manner to display windows 206 in these instances.

Further, window 224 may take various forms. For example, window 224 may be a visual area for application 222 framed by window decoration. In another example, window 224 may be a panel within another window, or take some other form in which information 212 can be displayed and interacted with by user 210 through user input 214.

In one illustrative example, one or more technical solutions are present that overcome a technical problem of optimally displaying windows on multiple display devices in a manner that increases the ease at which the information displayed on the windows can be reviewed by a user. As a result, one or more technical solutions may provide a technical effect of displaying a window for an application in a set of display devices in which the window is displayed in a manner that has an affinity to the manner in which the user interacts with the window.

For example, the affinity may be based on the manner in which the user interacts with the information displayed in the window. The window may be displayed to optimize viewing of information in a horizontal fashion or a vertical fashion depending on the manner in which the user moves the information within the window. By detecting the directional movement from the manner in which user input moves the information, an affinity for this type of interaction may be represented using a total display affinity for the particular application.

Further, the weighting of display affinities over time for an application enables adaptation to a situation in which the user changes the manner in which a particular application is used. Additionally, the technical solutions provide one or more technical facts in which the display of the window may be controlled for different configurations of display devices that may be employed by the user.

As a result, computer system 204 operates as a special purpose computer system in which window controller 202 in computer system 204 enables managing windows 206 in computer system 204. In particular, window controller 202 transforms computer system 204 into a special purpose computer system as compared to currently available general computer systems that do not have window controller 202.

The illustrations of window display environment 200 and the different components in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
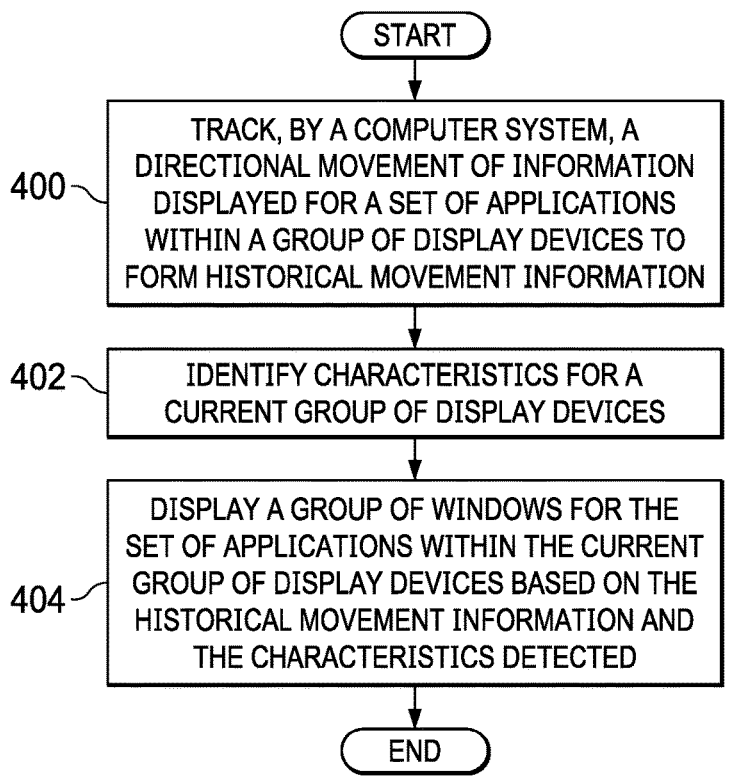
FIG. 4 is a flowchart of a process for managing windows in a computer system in accordance with an illustrative embodiment.

Turning next to FIG. 4, a flowchart of a process for managing windows in a computer system is depicted in accordance with an illustrative embodiment. The processes in FIG. 4 can be implemented in hardware, software, or both. When implemented in software, the processes can take the form of program code that is run by one of more processor units located in one or more hardware devices in one or more computer systems. For example, these processes can be implemented in window controller 202 running on computer system 204 in FIG. 2.

The process beings by tracking, by a computer system, a directional movement of information displayed for a set of applications within a group of display devices to form historical movement information (step 400). In step 400, the directional movement of the information occurs in response to a user input from a user.

The process identifies characteristics for a current group of display devices (step 402). The process displays a group of windows for the set of applications within the current group of display devices based on the historical movement information and the characteristics detected (step 404). The process terminates thereafter.

Figure 5:
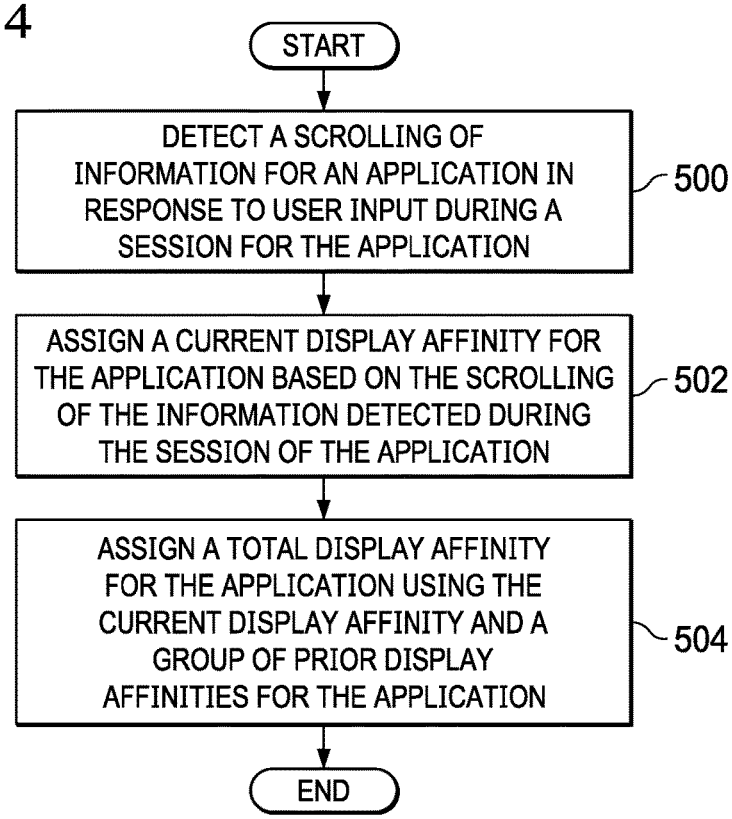
FIG. 5 is a flowchart of a process for tracking a directional movement of information in accordance with an illustrative embodiment.

With reference now to FIG. 5, a flowchart of a process for tracking a directional movement of information is depicted in accordance with an illustrative embodiment. The process illustrated in this flowchart is an example of one implementation for step 400 in FIG. 4.

The process begins by detecting a scrolling of information for an application in response to user input during a session for the application (step 500). In step 500, a session is the period of time while the window is displayed for the application.

The process assigns a current display affinity for the application based on the scrolling of the information detected during the session of the application (step 502). The process assigns a total display affinity for the application using the current display affinity and a group of prior display affinities for the application (step 504). The process terminates thereafter. The current display affinity and the group of prior display affinities are weighed based on a length of time. Older display affinities have a lower weighing.

Figure 6:
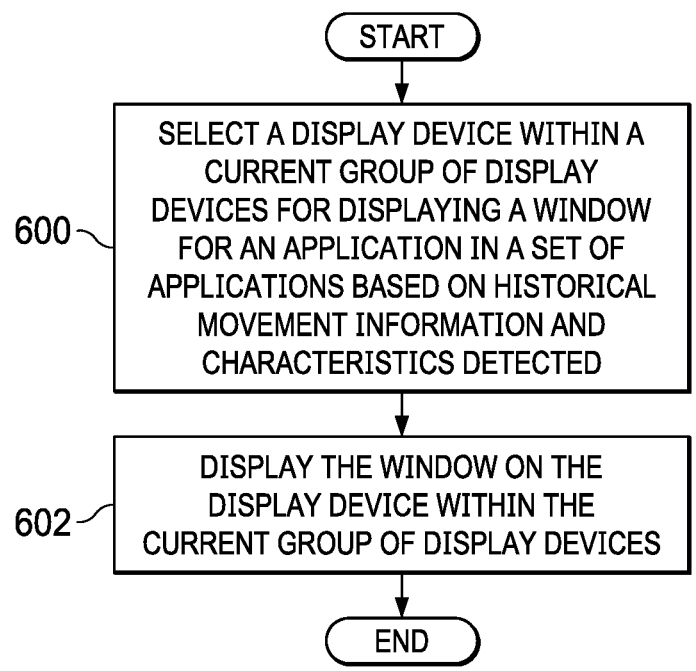
FIG. 6 is a flowchart of a process for displaying a window for an application in accordance with an illustrative embodiment.

In FIG. 6, a flowchart of a process for displaying a window for an application is depicted in accordance with an illustrative embodiment. The process illustrated in this flowchart is an example of one implementation for step 404 in FIG. 4.

The process beings by selecting a display device within a current group of display devices for displaying a window for an application in a set of applications based on historical movement information and characteristics detected (step 600). The process displays the window on the display device within the current group of display devices (step 602). The process terminates thereafter. In step 602, the window has a width and a height based on the historical movement information and the characteristics detected.

Figure 7:
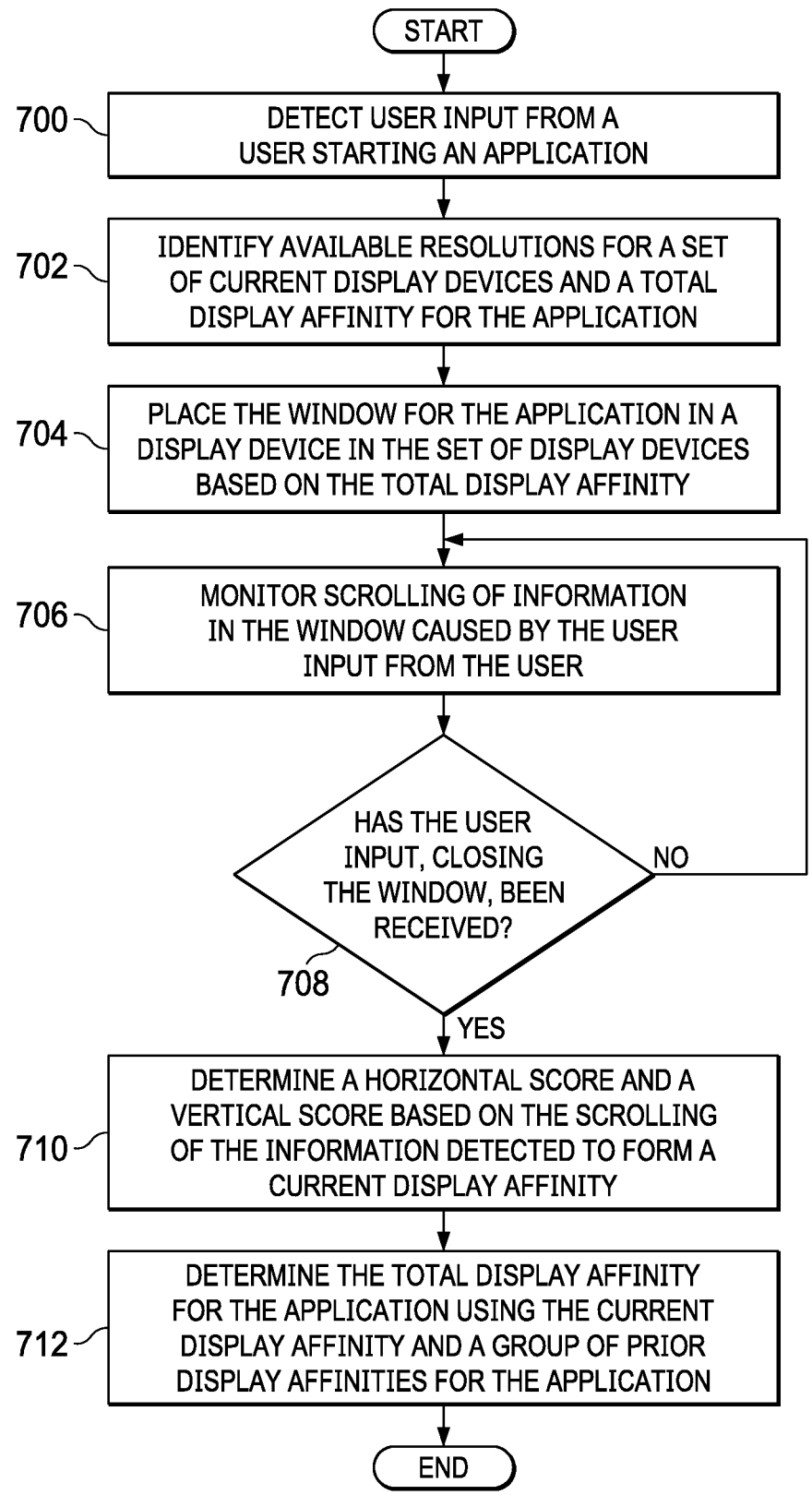
FIG. 7 is a more detailed flowchart of a process for managing windows in a computer system in accordance with an illustrative embodiment.

Turning to FIG. 7, a more detailed flowchart of a process for managing windows in a computer system is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in window controller 202 running on computer system 204 in FIG. 2.

The process begins by detecting user input from a user starting an application (step 700). The process identifies available resolutions for a set of current display devices and a total display affinity for the application (step 702). The process places the window for the application in a display device in the set of display devices based on the total display affinity (step 904).

The process monitors scrolling of information in the window caused by the user input from the user (step 706). A determination is made as to whether the user input, closing the window, has been received (step 708). If user input, closing the window, has not been received, the process returns to step 706.

Otherwise, the process determines a horizontal score and a vertical score based on the scrolling of the information detected to form a current display affinity (step 710). The process determines the total display affinity for the application using the current display affinity and a group of prior display affinities for the application (step 712). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
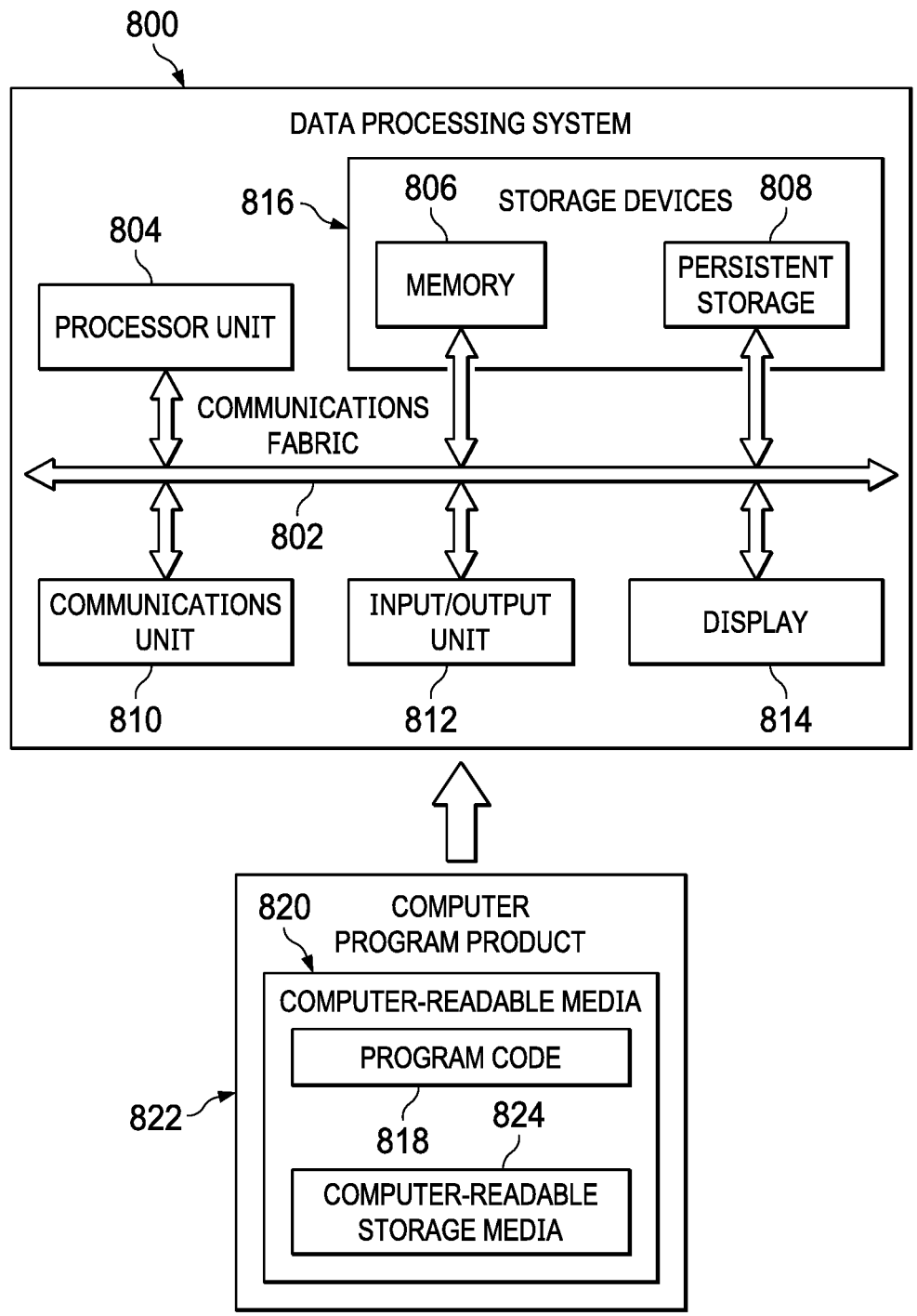
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement server computer 104 in FIG. 1, server computer 106 in FIG. 1, client devices 110 in FIG. 1, and computer system 204 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device.

Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative embodiments provide a method, apparatus, system, and computer program product for controlling the display windows on a set of display devices. For example, a computer system tracks a directional movement of information displayed for a set of applications within a group of display devices to form historical movement information, wherein the directional movement is in response to a user input from a user. The computer system identifies characteristics for a current group of display devices and displays a group of windows for the set of applications within the current group of display devices based on the historical movement information and the characteristics detected.

Thus, one or more technical solutions are present that overcome a technical problem with optimally displaying windows on multiple display devices in a fashion that increases the usefulness of the information displayed on the windows for a user. The illustrative examples provide a technical solution that results in an improved computer system in which the user does not have to move and adjust windows when starting applications.

One or more illustrative examples detects the manner in which a user interacts with information displayed in a window for an application. For example, the directional movement resulting from user input is detected. This directional movement can be horizontal and vertical scrolling detected in user input from the user. The amount of scrolling in these different directions form affinities for horizontal or vertical viewing of information. One or more illustrative examples determines these affinities and uses the affinities for displaying the window for the application when the user starts the application at a later time. In other words, one or more illustrative examples, detects the scrolling behavior of the user in interacting with the information displayed in a window for the application. This identification is performed automatically without requiring user action to describe the manner in which the window should be displayed for the application. A total display affinity is determined and used to determine a particular display device for use in displaying window the next time the application is started. This placement of windows is customized for particular user.

As a result, different users using the same application may have different window placements because of the different manner in which they interact with information displayed a window for the application. Thus, one or more illustrative examples provides an improved mechanism for a display of windows on one or more display devices that are customized based a user interacting with information displayed in a window for an application. This control of the display of windows is adaptable to take into account changes in the manner that a user may interact with information in a window for an application over time.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method comprising:
    managing windows in a computer system by the computer system:
        tracking a directional movement of information displayed for a set of applications within a group of display devices to form historical movement information, wherein the directional movement:
            is in response to a user input from a user; and
            indicates an affinity for scrolling information displayed in a window for an application in a horizontal direction or a vertical direction;
        identifying characteristics for a current group of display devices; and
        displaying a group of the windows for the set of applications within the current group of display devices based on the historical movement information, the affinity, and the characteristics detected.

2. The method of claim 1, wherein the tracking comprises:
tracking a scrolling of the information in a vertical direction and a horizontal direction for the set of applications within the group of display devices to form the historical movement information, wherein the scrolling of the information in the vertical direction and the horizontal direction is in response to the user input by the user.

3. The method of claim 1, wherein the tracking comprises:
detecting a scrolling of the information for the set of applications in response to the user input;
assigning a set of current display affinities to the set of applications based on the scrolling of the information; and
assigning a set of total display affinities for the set of applications using the set of current display affinities and a group of prior display affinities for the set of applications in which the set of current display affinities and the group of prior display affinities are weighed based on a length of time.

4. The method of claim 3, wherein a total display affinity in the set of total display affinities for an application in the set of applications comprises a vertical score and a horizontal score.

5. The method of claim 1, wherein the tracking comprises:
tracking the directional movement of the information displayed for the set of applications within a plurality of different configurations for the group of display devices to form the historical movement information, wherein the directional movement is in response to the user input from the user.

6. The method of claim 1, wherein the identifying comprises:
identifying the characteristics for the current group of display devices in response to at least one of starting an application in the set of applications by the user or a change in a configuration of the current group of display devices.

7. The method of claim 1, wherein the displaying comprises:
selecting a display device within the current group of display devices for displaying a window for an application in the set of applications based on the historical movement information and the characteristics detected; and
displaying the window on the display device within the current group of display devices, wherein the window has a width and a height based on the historical movement information and the characteristics detected.

8. The method of claim 1, wherein, when an application is started, the current group of display devices is used by the user for a first time.

9. A window display system comprising:
a computer system that:
tracks a directional movement of information displayed for a set of applications within a group of display devices to form historical movement information, wherein the directional movement:
is in response to a user input from a user; and
indicates an affinity for the user to scroll information displayed in a window in one of a horizontal direction or a vertical direction;
identifies characteristics for a current group of display devices; and
displays a group of windows for the set of applications within the current group of display devices based on the historical movement information, the affinity, and the characteristics detected.

10. The window display system of claim 9, wherein tracking the directional movement comprises the computer system tracking a scrolling of the information in a vertical direction and a horizontal direction for the set of applications within the group of display devices to form the historical movement information, wherein the scrolling of the information in the vertical direction and the horizontal direction is in response to the user input by the user.

11. The window display system of claim 9, wherein tracking the directional movement comprises the computer system:
detecting a scrolling of the information for the set of applications in response to the user input;
assigning a set of current display affinities to the set of applications based on the scrolling of the information; and
assigning a set of total display affinities for the set of applications using the set of current display affinities and a group of prior display affinities for the set of applications in which the set of current display affinities and the group of prior display affinities are weighed based on a length of time.

12. The window display system of claim 11, wherein a total display affinity in the set of total display affinities for an application in the set of applications comprises a vertical score and a horizontal score.

13. The window display system of claim 9, wherein tracking the directional movement comprises the computer system tracking the directional movement of information displayed for the set of applications within a plurality of different configurations for the group of display devices to form the historical movement information, wherein the directional movement is in response to the user input from the user.

14. The window display system of claim 9, wherein identifying the characteristics for the current group of display devices comprises the computer system identifying the characteristics for the current group of display devices in response to at least one of starting an application in the set of applications by the user or a change in a configuration of the current group of display devices.

15. The window display system of claim 9, wherein displaying the group of windows comprises the computer system:
selecting a display device within the current group of display devices for displaying a window for an application in the set of applications based on the historical movement information and the characteristics detected; and
displaying the window on the display device within the current group of display devices, wherein the window has a width and a height based on the historical movement information and the characteristics detected.

16. The window display system of claim 9, wherein, when an application is started, the current group of display devices is used by the user for a first time.

17. A computer program product comprising:
a computer-readable storage medium including instructions for managing windows displayed in a computer system, wherein the computer-readable storage medium is not a transitory signal per se, and the instructions comprise:
first program code for tracking a directional movement of information displayed for a set of applications within a group of display devices to form historical movement information, wherein the directional movement:
is in response to a user input from a user; and
indicates an affinity for scrolling in a horizontal direction or a vertical direction;
second program code for identifying characteristics for a current group of display devices; and
third program code for displaying a group of windows for the set of applications within the current group of display devices based on the historical movement information, the affinity, and the characteristics detected.

18. The computer program product of claim 17, wherein the first program code comprises:
fourth program code for tracking a scrolling of the information in a vertical direction and a horizontal direction for the set of applications within the group of display devices to form the historical movement information, wherein the scrolling of the information in the vertical direction and the horizontal direction is in response to the user input by the user.

19. The computer program product of claim 17, wherein the first program code comprises:
fourth program code for detecting scrolling of the information for the set of applications in response to the user input;
fifth program code for assigning a set of current display affinities to the set of applications based on the scrolling of the information; and
sixth program code for assigning a set of total display affinities for the set of applications using the set of current display affinities and a group of prior display affinities for the set of applications in which the set of current display affinities and the group of prior display affinities are weighed based on a length of time, wherein a total display affinity in the set of total display affinities for an application in the set of applications comprises a vertical score and a horizontal score.

20. The computer program product of claim 17, wherein:
the second program code comprises fourth program code for selecting a display device within the current group of display devices for displaying a window for an application in the set of applications based on the historical movement information and the characteristics detected; and
the third program code comprises fifth program code for displaying, by the computer system, the window on the display device within the current group of display devices, wherein the window has a width and a height based on the historical movement information and the characteristics detected.

21. The method of claim 1, wherein the affinity is based on a current vertical score, a current horizontal score, a current weight, a prior vertical score, a prior horizontal score, a prior weight, and a number of prior affinities.

* * * * *